United States Patent
Blackburn et al.

(10) Patent No.: US 7,543,980 B2
(45) Date of Patent: *Jun. 9, 2009

(54) MIXING MACHINE AND ASSOCIATED BOWL GUARD SYSTEM

(75) Inventors: Neal H. Blackburn, Springfield, OH (US); Janice J. Schnipke, Springfield, OH (US); Brian E. Bader, Springfield, OH (US); Joseph C. Huang, Dayton, OH (US); Howard A. Hartley, Jr., Brookville, OH (US); William C. Schlieper, Tipp City, OH (US); Brian Kadel, Dayton, OH (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/112,348

(22) Filed: Apr. 30, 2008

(65) Prior Publication Data

US 2008/0198692 A1 Aug. 21, 2008

Related U.S. Application Data

(63) Continuation of application No. 11/102,136, filed on Apr. 8, 2005, now Pat. No. 7,384,187.

(51) Int. Cl.
*B01F 13/04* (2006.01)
(52) U.S. Cl. .................. 366/206; 366/601
(58) Field of Classification Search .............. 366/142, 366/197, 206, 287, 288, 347, 601
See application file for complete search history.

(56) References Cited

U.S. PATENT DOCUMENTS

| 3,875,423 | A | * | 4/1975 | Kemper ............... 307/113 |
| 5,306,083 | A | * | 4/1994 | Caldwell et al. ....... 366/347 |
| 5,348,393 | A | * | 9/1994 | Pappas, Jr. ............ 366/207 |
| 5,472,276 | A | * | 12/1995 | Ratermann et al. ..... 366/203 |
| 5,533,806 | A | * | 7/1996 | Veltrop et al. .......... 366/347 |
| 6,062,725 | A | * | 5/2000 | Paturel et al. .......... 366/347 |
| 6,068,398 | A | * | 5/2000 | Lin ..................... 366/347 |
| 6,435,708 | B1 | * | 8/2002 | Huang .................. 366/347 |
| 6,827,481 | B2 | * | 12/2004 | Yoshioka .............. 366/347 |
| 7,384,187 | B2 | * | 6/2008 | Blackburn et al. ...... 366/206 |
| 2004/0022124 | A1 | * | 2/2004 | Yoshioka .............. 366/347 |

FOREIGN PATENT DOCUMENTS

| DE | 4417956 | 12/1994 |
| EP | 0512172 | 10/1995 |
| EP | 1027920 | 8/2000 |
| FR | 2740064 | 4/1997 |
| GB | 2255608 | 11/1992 |

* cited by examiner

*Primary Examiner*—David L Sorkin
(74) *Attorney, Agent, or Firm*—Thompson Hine LLP

(57) ABSTRACT

A mixer may include one or more of (i) a readily installable and removable bowl guard member, (ii) a bowl guard sensor arrangement, (iii) a bowl guard support ring assembly including a plastic part and a metal part, (iv) a bowl guard support ring assembly and bowl guard member that interact for limiting movement of the bowl guard member.

14 Claims, 6 Drawing Sheets

000
MIXING MACHINE AND ASSOCIATED BOWL GUARD SYSTEM

CROSS-REFERENCES

This application is a continuation of application Ser. No. 11/102,136 filed Apr. 8, 2005, the entire specification of which is incorporated herein by reference.

TECHNICAL FIELD

This application relates generally to mixing machines of the type commonly used to mix food products and, more specifically, to a bowl guard construction and system used in connection with such mixing machines.

BACKGROUND

Mixers are used to mix and blend a variety of materials such as food products. For some time it has been known to provide bowl guard arrangements in connection with such mixing machines. Assuring that a bowl guard assembly is in a proper bowl guarding orientation before operating the mixer continues to be desirable. Providing a bowl guard assembly in which the path for bowl guard member removal and installation is readily viewed would also be desirable.

SUMMARY

In one aspect, a mixer includes a bowl guard assembly having first and second portions, at least the second portion is movable to enable the bowl guard assembly to be arranged in both a bowl guarding orientation and a bowl access orientation. The second portion includes one of a magnet and a magnetically conductive path that moves with the second portion, the first portion includes the other of the magnet and the magnetically conductive path. When the bowl guard assembly is in the bowl guarding orientation the magnet is positioned at a distance from the bowl guard sensor so that the magnetically conductive path is necessary in order for a magnetic field from the magnet to reach and trigger the bowl guard sensor.

In another aspect, a mixer includes a bowl guard assembly including a first portion and a second portion, the second portion supported on a circular support path for rotation between a bowl guarding position relative to the first portion and a bowl access position relative to the first portion. The second portion may be removable from the bowl guard support via movement upward relative to the circular support path and laterally away from an upright axis of the circular support path.

In a further aspect, a mixer includes a bowl guard support ring assembly including a plastic support ring positioned adjacent an underside of a head portion of the mixer and having a peripheral lip. A metallic ring is connected with the underside of the plastic support ring and includes a portion positioned such that a circular support path is provided between the peripheral lip and the portion.

In still another aspect, a mixer includes a bowl guard support ring assembly at an underside of a head portion of the mixer to provide a circular support path and a stop is positioned proximate to and along the circular support path. A bowl guard member has at least first and second guide members positioned on the circular support path for support, the guide members movable along the circular support path to enable the bowl guard member to rotate between a bowl guarding position and a bowl access position. The first guide member is configured for contacting the stop to limit rotational movement of the bowl guard member and the second guide member is configured to pass by the stop during rotational movement of the bowl guard member.

DETAILED DESCRIPTION

Figure 1:
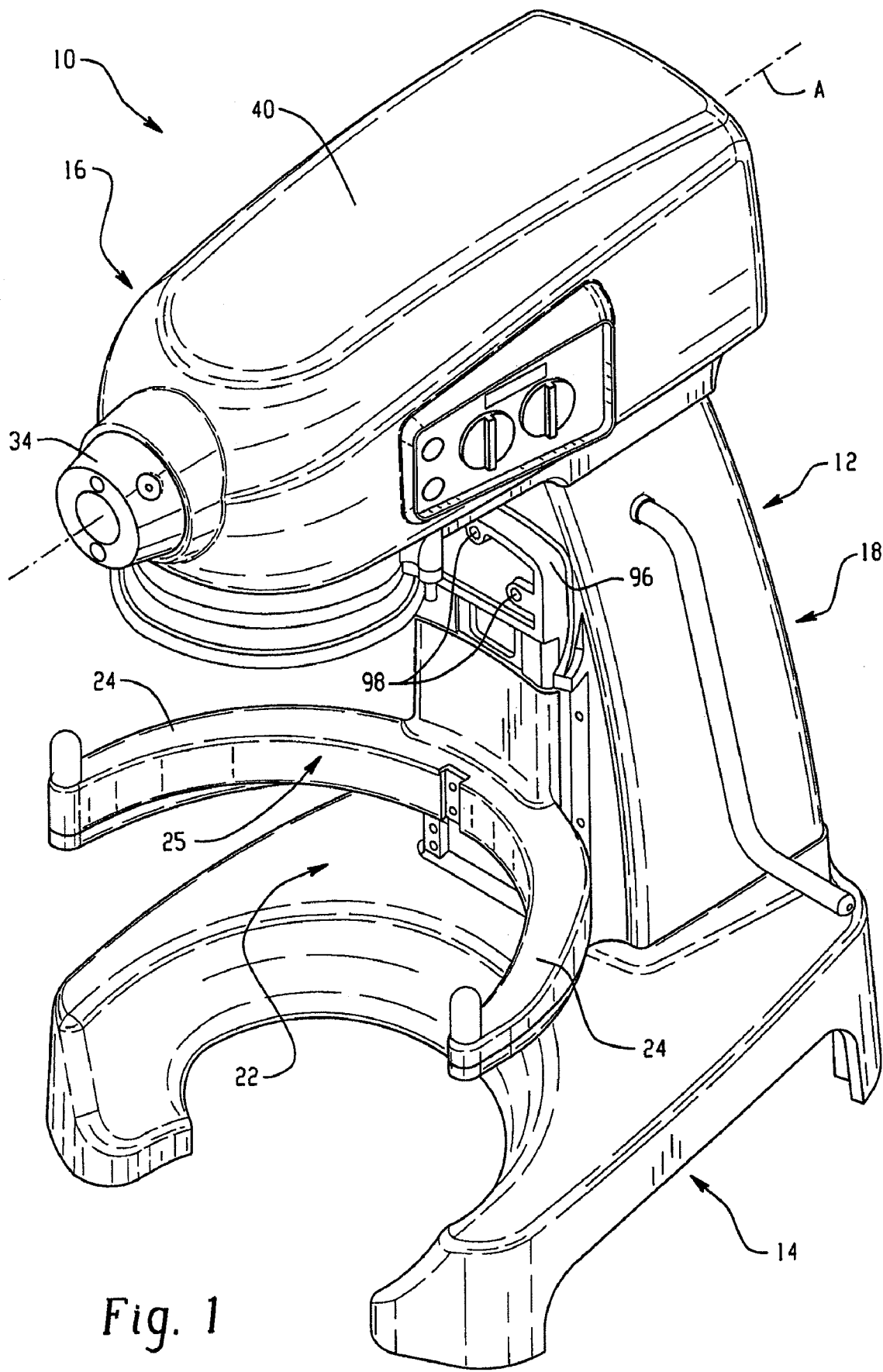
FIG. 1 is a perspective view of an exemplary mixer.
Figure 2:
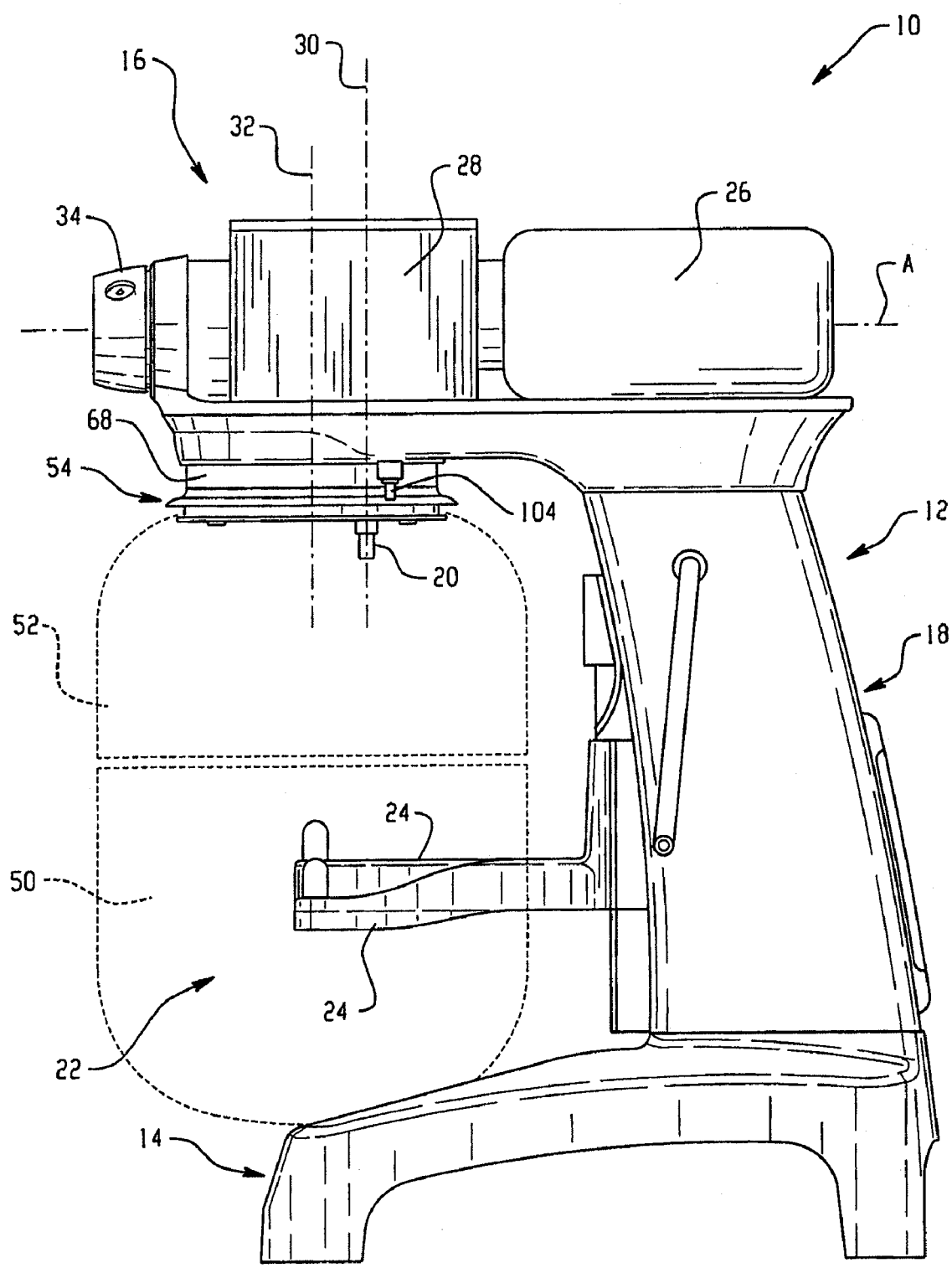
FIG. 2 is a side elevation of the mixer of FIG. 1 with head cover removed.

Referring to FIGS. 1 and 2, a mixing machine 10 includes a mixer body 12 having a base portion 14, a head portion 16 and a support portion 18 (e.g., in the form of a column) connecting the head portion and the base portion in a vertically spaced apart relationship. A front to back head portion axis A is shown. An output member 20 (e.g., a shaft for receiving a mixer tool such as a beater or whip) extends downward from the head portion 16 in a direction toward a bowl receiving location 22 formed between the arms 24 of a bowl receiving yoke that can be moved upward and downward relative to the head portion 16 by rotation of the illustrated handle. A motor 26 may be mechanically linked to the output member 20, as by a gear system 28, for effecting rotation of the output member about a first axis 30 and orbiting movement of the output member 20 and first axis 30 about a second axis 32 (e.g., a planetary movement or planetary rotation). A power take off 34 extends outwardly from a front side of the head portion 16 and may take the form of a protruding hub or boss that is adapted for connection with mixer accessories such as meat grinders, slicers etc. Internal of the power take off 34 is a drive member that is rotated by the motor 26 via the gear system 28. Head cover 40 is shown installed in FIG. 1, but is removed in FIG. 2.

An exemplary mix position of a bowl 50 is shown schematically in FIG. 2, along with an exemplary position of a bowl guard assembly 52. Bowl guard support 54 is located at the underside of the head portion 16 of the mixer and supports at least part of the bowl guard assembly 52 in a manner that enables the part to be moved between a bowl guarding position and a bowl access position.

Figure 3A:
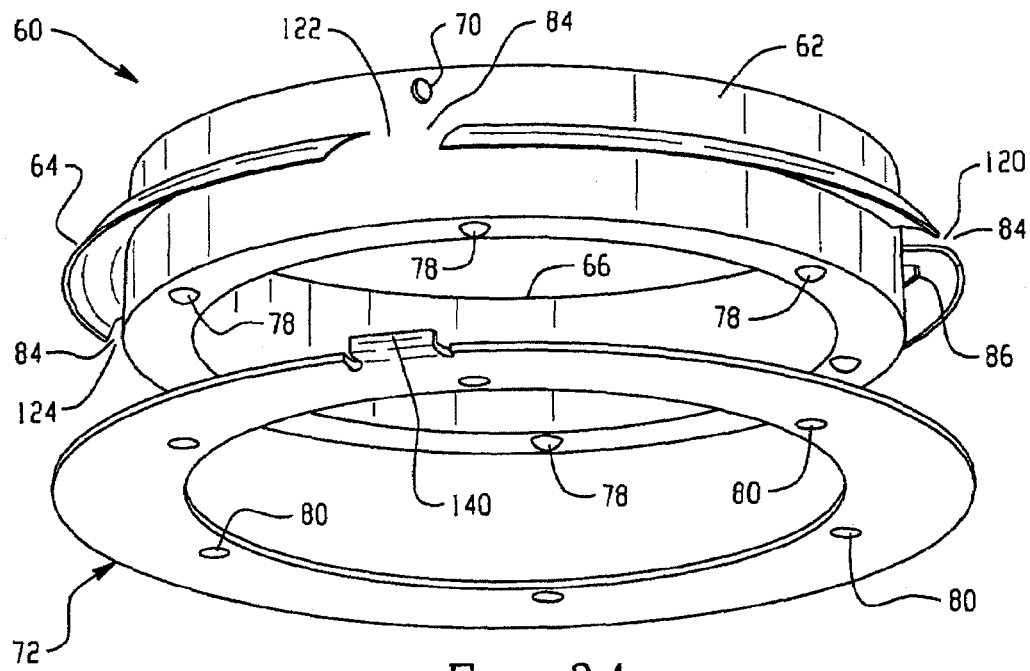
FIGS. 3A and 3B depict a bowl guard support ring assembly.
Figure 3B:
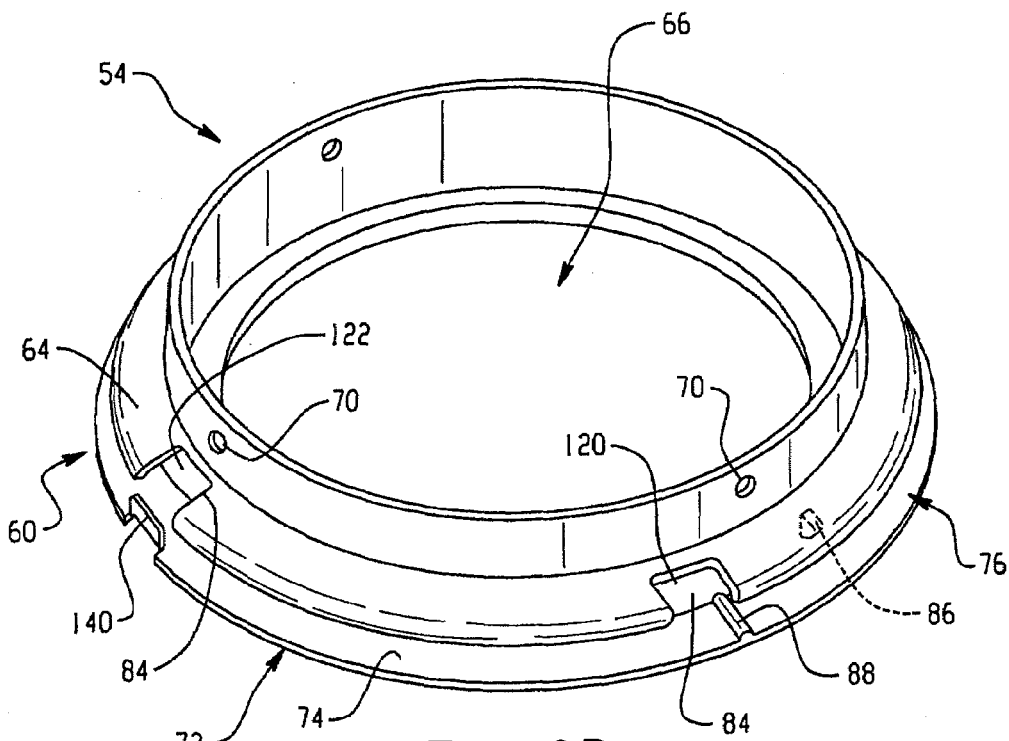

Referring to FIGS. 3A and 3B, in one embodiment the bowl guard support is formed by a bowl guard support ring assembly 60 including a support ring 62 that is positioned adjacent an underside of the head portion of the mixer and that has a peripheral lip 64. The support ring 62 includes central opening 66 that may be disposed about a cylindrical, downward extension 68 (FIG. 2), which may be part of a metal casting, of the mixer head and fastened thereto by fasteners that extend through openings 70 in the support ring 62. A generally planar, annular ring 72 is connected at the underside of the support ring 62 and has an upper surface portion 74 positioned such that a circular support path 76 is provided between the peripheral lip 64 and the portion 74. In one example, the support ring 62 may be formed of plastic and the annular ring 72 may be formed of metal. The underside of the plastic support ring 62 includes protrusions 78 that are positioned for alignment with openings 80 in the metallic annular ring 72 enabling the metallic annular ring 72 to be heat staked to the plastic support ring 62 by holding the annular ring adjacent the underside of the plastic support ring 62 and effecting a melting of the protrusions 78 such that the melted plastic passes downward through the openings 80. Once the plastic re-hardens, it holds the annular ring 72 to the underside of the plastic support ring 72. The heat staking operation may be performed prior to mounting of the bowl guard support ring assembly onto the mixer.

The lip 64 is configured to enable a bowl guard member to be readily mounted for movement along the circular support path 76, while at the same time permitting removal for cleaning, and includes spaced apart gaps or slots 84 for such purpose. The illustrated embodiment includes three such slots 84, but the number could vary. As seen in FIG. 3A a stop 86 is positioned proximate to and along the circular support path. As seen in FIG. 3B a detent 88, which may take the form of a raised portion on the annular ring 72, is also located along the circular support path. In one example the stop 86 is positioned at one side of one of the slots 84 and the detent 88 is slightly spaced away from the stop toward the one slot. A spacing between the detent and slot may be sized for receiving a mount guide of a bowl guard member therebetween.

Figure 4:
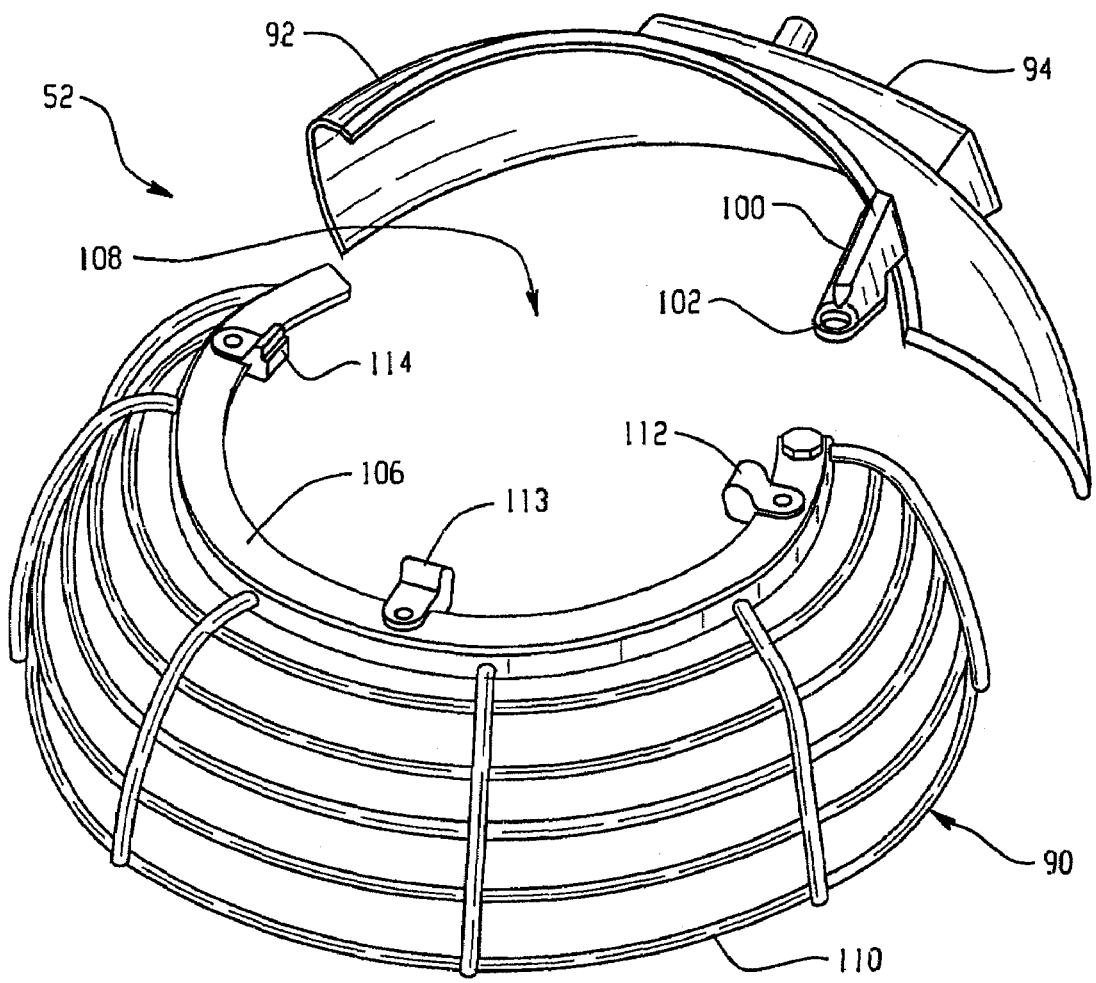
FIG. 4 depicts a bowl guard assembly.

Referring now to FIG. 4, in one embodiment the bowl guard assembly includes a movable bowl guard member 90, which may be of a wire cage construction, and a fixed position bowl guard member 92, which may have a generally closed configuration and may also be referred to as a splash guard. The illustrated bowl guard member 92 includes a mount frame or platform 94 extending from its rear side, which mount frame 94 may be configured for connection to a correspondingly sized and shaped mount base 96 (FIG. 1) located on the column 18 of the mixer. In this regard, the mount base 96 includes fastener openings 98 that can be used for mounting, as by passing fasteners from within the column 18, through the mount base openings 98 and into corresponding openings (not shown) on the mount frame 94 (FIG. 4).

In one embodiment, the splash guard 92 may be of molded plastic construction and may include a finger or other extension 100 toward one side thereof, which extension in the illustrated embodiment is located toward an upper part of the splash guard 92. The extension 100 includes a downward extending opening 102, one purpose of which is to receive the lower part of a downward rod-type extension 104 (FIG. 2) located on one side of the mixer head 16. Cooperation of extension 104 and opening 102 can provide some aid in holding the splash guard 92 in place or restricting lateral movement of the upper part of the splash guard 92.

The bowl guard member 90 includes an upper support rim 106 that in the illustrated example extends through about 210 circumferential degrees, such that a mounting gap 108 is formed between ends of the rim. The downwardly extending wire cage 110 has a similar circumferential extension, in which case the mounting gap 108 and the splash guard 92 may have a circumferential extension of about 150 degrees. However, variations are possible, including the support rim and wire cage extending through a range of between about 60 and about 300 (or in another example between about 120 and about 240 circumferential degrees), such that the mounting gap extends through a range of between about 300 and about 60 circumferential degrees (or in another example between about 240 and about 120 circumferential degrees). Forming the bowl guard member 90 with a mounting gap 108 facilitates installation and removal of the bowl guard member 90, via the upper support rim 106, laterally onto and off of the bowl guard support as described in greater detail below. The upper support rim 106 includes inwardly extending mount guides 112, 113 and 114, which are configured for positioning within and movement along the raceway formed between the lip 64 and the annular plate 72 of the bowl guard support ring assembly 54 (FIG. 3B).

Referring to FIGS. 4 and 3B, the mount guides 112, 113 and 114 are spaced apart by a distance that corresponds to the spacing of the slots 84 located in the lip 64 so that the guides can be moved downward into the raceway when the guard member 90 is positioned to place the mount guides 112, 113 and 114 vertically above the slots 84. In this regard, installation of the guard member 90 onto the bowl guard support ring assembly 54 involves placing the guard member 90 laterally alongside the support ring assembly 54 (e.g, toward the front of the mixer with the mount gap facing rearward) with the mount guides 112, 113 and 114 above the support ring assembly 54. The guard member 90 is then moved laterally rearward, and rotated if necessary, until the guide members 112, 113 and 114 are located directly above the slots 84, at which point the guard member 90 is moved vertically downward to place the mount guides in the raceway. The mount guides 112, 113 and 114 facilitate rotational movement of the guard member 92 by sliding over the upper surface portion 74 of the annular ring 72 along the circular support path 76. Removal of the guard member for cleaning is as convenient as aligning the mount guides 112, 113 and 114 with the slots 84, raising the guard member vertically upward until the mount guides 112, 113 and 114 pass through the slots 84 and then laterally pulling the guard member 90 away from the support ring assembly 54. A vertical spacing between the lower edge of lip 64 and the annular support ring 72 may be smaller than the vertical height of the mount guides such that the mount guides can only leave the raceway via the slots in the rim.

Referring now to FIGS. 3A, 3B and 4, the illustrated embodiment contemplates three access gaps or slots 84 in the lip 64, with a stop 86 and detent located alongside the access slot also designated as 120, which may be located, in one example, on the right hand side of the mixer. Access slot 122 would be located generally at the front of the mixer and access slot 124 would be located at the left hand side of the mixer. During installation and removal, mount guide 112 aligns with slot 120, mount guide 113 aligns with slot 122 and mount guide 114 aligns with slot 124. Mount guide 112 is configured to engage the stop 86 when the bowl guard member is in a bowl guarding position (e.g., the guard member 90 is not significantly nested with the splash guard 92 such that the combination of guard member 90 and splash guard 92 substantially circumscribes the area above the opening of the bowl). The stop 86 thereby prevents the guard member 90 from rotating into nesting relationship with the splash guard 92 in a first direction (e.g., counterclockwise when viewed from above in the described example) that would require the mount guide 112 to move past the stop 86. The mount guide 112 is also configured to interact with the detent 88 so as to provide limited resistance to movement of the bowl guard member 90 out of the bowl guarding position while still permitting the mount guide 112 to slide past the detent 88 when the bowl guard 90 is rotated in a second, opposite direction (e.g., clockwise when viewed from above in the described example). As the guard member 90 is rotated into nesting arrangement with the splash guard, access to the contents of the bowl is provided, and the mount guide 114 moves along the raceway toward the stop 86. Mount guide 114 may be configured to permit it to move past the stop 86 so that the guard member 90 can be rotated far enough to allow the operator to establish a desired extent or location of the access passage to the bowl. On the other hand, mount guide 113 may be configured similar to mount guide 114 so that mount guide 113 engages the stop and limits the rotation of guard member in the second direction.

Figures 5A, 5B:
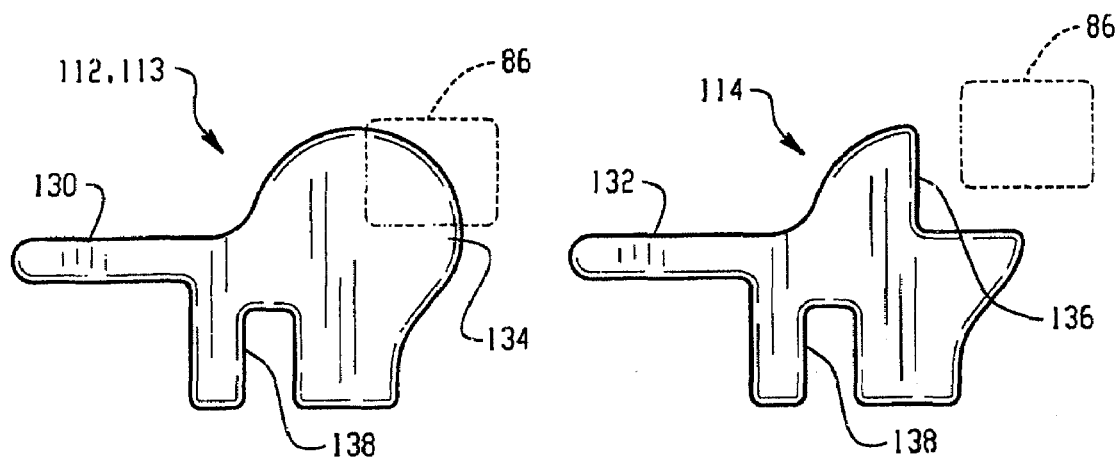
FIGS. 5A and 5B depict mount guide configurations.

FIG. 5A depicts an exemplary side elevation of mount guides 112 and 113 and FIG. 5B depicts an exemplary side elevation of mount guide 114, both showing the general location of the stop 86 in dashed line. Both mount guide configurations include respective mount fingers 130, 132 that may be used to connect the respective guide to the support rim 106 of the guard member 90 (as by the use of fasteners). As shown, the inner and upper portion 134 of mount guides 112 and 113 is generally full in order to provide solid contact with the stop 86, but the inner and upper portion 136 of mount guide 114 is generally cut away or open so as to avoid contacting the stop 86. Notably, the mount guides may include a slot 138 at the underside thereof. The slot 138 is positioned to permit a lip 140 (FIG. 3B) to pass therethrough, where the lip 140 is located in alignment with access slot 122 and extends upwardly from the annular ring 72. Thus, when mount guide 112 aligns with access slot 122, cooperation between the slot 138 and the lip 140 prevents lateral movement of the mount guide 112 out of the access slot.

Figure 6:
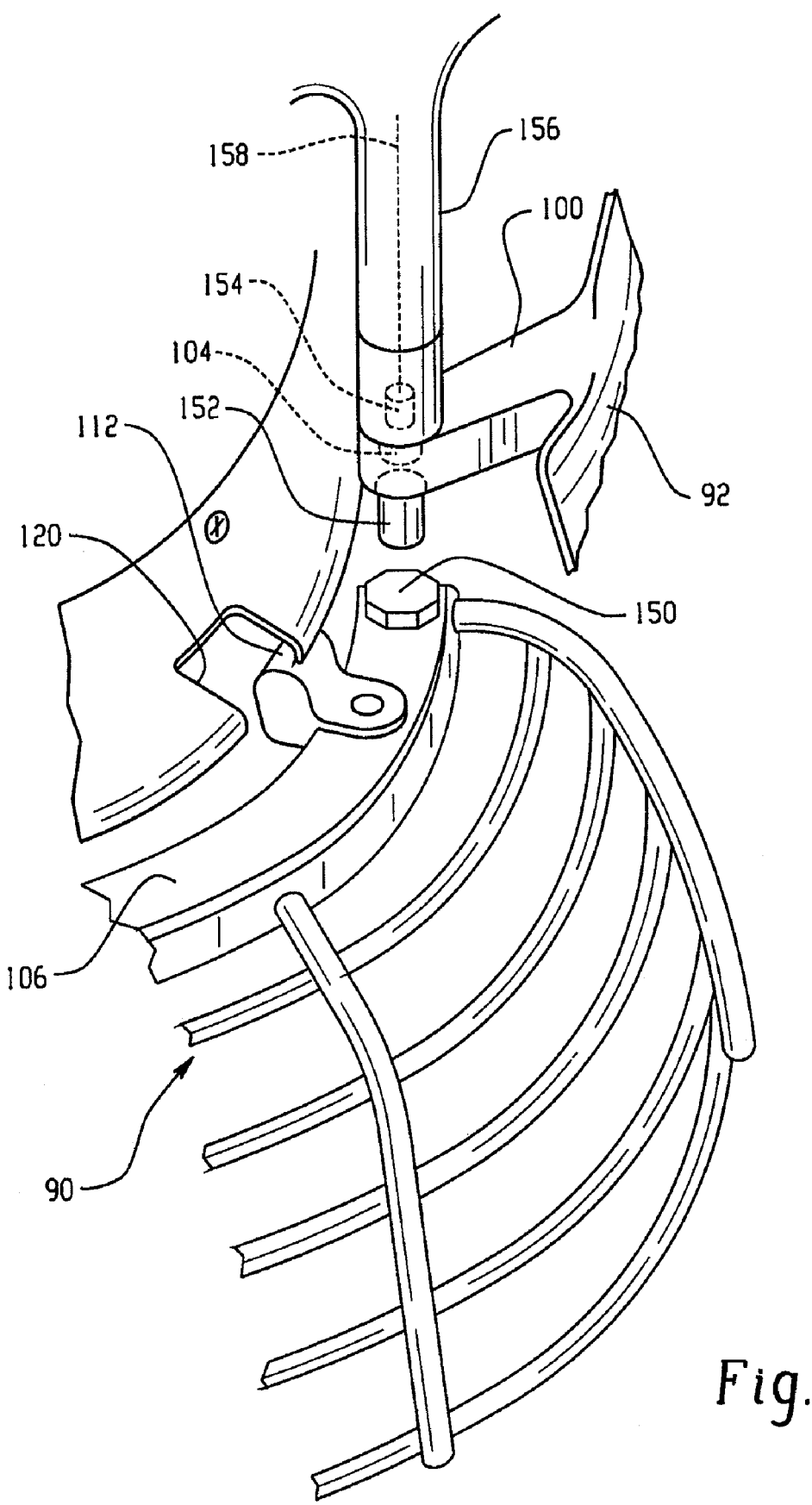
FIG. 6 shows an enlarged partial perspective view of a bowl guard sensor arrangement.

Referring now to FIG. 6, an enlarged partial view of the bowl guard assembly is shown with the bowl guard member 90 located in its bowl guarding position. Notably, a magnet 150 is located atop the support rim 106 near the end thereof and is positioned proximate to and beneath a member 152 that extends downward from finger 100 on splash guard 92. The member 152 may be formed of a magnetically conductive metal insert that is placed within the opening 102 (FIG. 4) of the finger 100 prior to positioning the downward extension 104 of the mixer head in the opening 102. A magnetically actuatable bowl guard sensor 154 is positioned within portion 156 of the mixer head casting and includes wiring that connects the sensor 154 with the drive system of the mixer. The combination of the insert member 152 on the finger 100 and the extension 104 from the mixer head forms a magnetically conductive path that enables the magnetic field of magnet 150 to be detected by the sensor 154 when the guard member 90 is in its bowl guarding position. If the guard member 90 is rotated out of its bowl guarding position, the additional distance of the magnet 150 from the magnetically conductive path is such that the magnetic field of the magnet 150 can no longer be detected or no longer triggers the sensor 154. Likewise, even when the guard member 90 is in the illustrated bowl guarding position, the magnet 150 is positioned at a sufficient distance from the bowl guard sensor 154 so that the magnetically conductive path provided by the metal insert 152 is necessary in order for a magnetic field from the magnet 150 to trigger the bowl guard sensor 154.

In one embodiment the sensor 154 is a switch (e.g., a reed switch) with a conducting state and a non-conducting state, and a guard fault output is provided when the switch is in the non-conducting state. The reed switch may be biased into the non-conducting state, with the magnetic field from the magnet 150 causing the switch to move to its conducting state when the bowl guard member 90 is in the bowl guarding position. The drive system of the mixer may be configured such that if the reed switch is in the non-conducting state, the drive system is prevented from effecting rotation of the output member 20 of the mixer. Other embodiments in which the sensor includes a state in which its output indicates the bowl guarding orientation and another state in which its output indicates a bowl access orientation are possible. Other functions of the mixer could also be disabled based upon sensor 154. By providing an arrangement in which the magnet 150 on the guard member 90 must be in a certain position (or in proximity to such certain position) and in which the metallic insert 152 must also be in a certain position (or in proximity to such certain position) in order to trigger the sensor 154, movement of the output member 20 is prevented if either one or both of the guard member 90 and the splash guard 92 are not properly positioned in a bowl guarding orientation.

Figure 7:
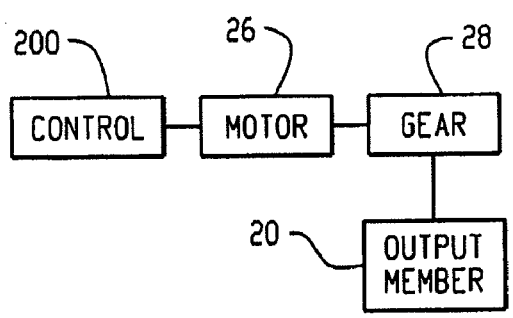
FIG. 7 is a schematic view of a drive system.

FIG. 7 provides a schematic of a basic drive system that includes a control 200 associated with motor 26 that is in turn connected to gearing system 28 to rotate the output member 20. The bowl guard sensor is connected to and/or may be considered part of the control 200 (e.g., as by providing an electronic input thereto or as by controlling the state of a relay that allows power to be delivered to the motor).

Figure 8:
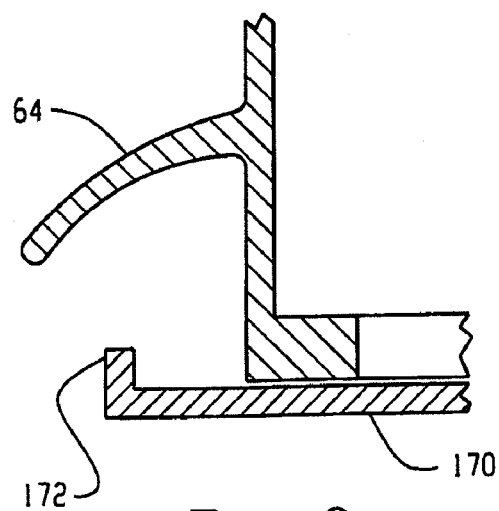
FIG. 8 is a cross-section of an alternative bowl guard support ring assembly.
Figure 9:
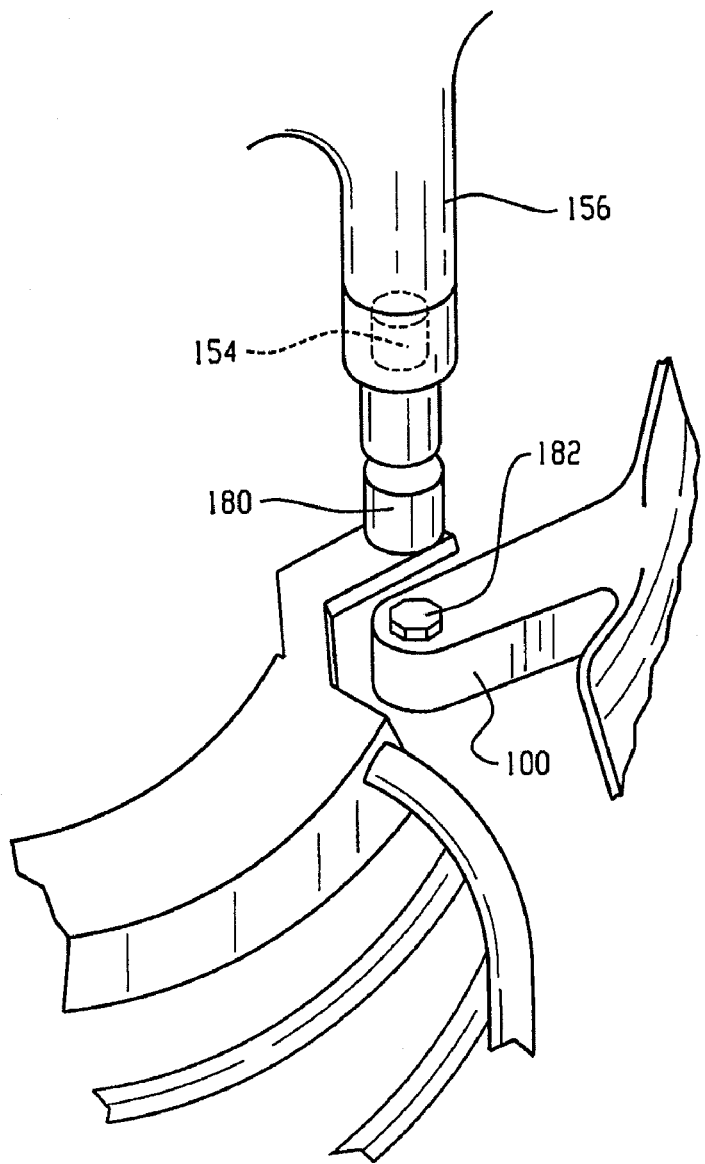
FIG. 9 is a partial perspective view of an alternative bowl guard sensor arrangement.

It is to be clearly understood that the above description is intended by way of illustration and example only, is not intended to be taken by way of limitation, and that changes and modifications are possible. For example, while the above-described bowl guard support ring assembly is provided with a generally planar, horizontal lower surface (except for lip 140) along which the mount guides slide, alternative arrangements are possible. For example, in another embodiment shown in FIG. 8, the annular support ring 170 may be formed with an upwardly extending circular rail 172 along its entire periphery, in which case the lower slot in the mount guides could always ride along the rail 172. Moreover, while the arrangement illustrated in FIG. 6 provides the magnet on the guard member 90 and the metallic insert on the splash guard 92, it is possible that the respective positions could be reversed, in which case the guard member 90 could include a magnetically conductive path part 180 that moves into a space between the magnet 182 on splash guard finger 100 and the sensor 154 in the mixer head, as reflected in FIG. 9. Still further, magnetic bowl guarding position sensing arrangements using a combination of a magnet and magnetically conductive path could be useful in bowl guard systems having other configurations, such as a configuration where both guard member 90 and splash guard 92 are mounted for rotation, or a configuration where the guard member 90 moves in a manner other than rotational (e.g., the guard member is pivoted upward about a generally horizontal axis when the guard member 90 moves out of its bowl guarding position. Other variations are possible.

What is claimed is:

1. A mixing machine, comprising:
   a mixer body including a head portion that extends over a bowl receiving location, the head portion including a magnetically actuatable bowl guard sensor for providing a guard fault output;
   an output member extending downward from the head portion toward the bowl receiving location;
   a drive system linked to the output member for effecting planetary rotation of the output member, the drive system connected with the bowl guard sensor, the drive system and bowl guard sensor operate together such that in a first state of the bowl guard sensor planetary rotation of the output member can be effected by the drive system and in a second state of the bowl guard sensor planetary rotation of the output member cannot be effected by the drive system;
   a bowl guard assembly including a first portion and a second portion, at least the second portion is movable to enable the bowl guard assembly to be arranged in both a bowl guarding orientation and a bowl access orientation, a magnetically conductive member associated with the first portion, the second portion includes a magnet, when the second portion is positioned to place the bowl guard assembly in the bowl guarding orientation the magnet is positioned at a distance from the bowl guard sensor so that the magnetically conductive member is necessary in order for a magnetic field from the magnet to reach the bowl guard sensor and place the bowl guard sensor in its first state, wherein removal of the first portion of the bowl guard assembly causes the magnetically conductive member to move out of a position that conducts the magnetic field from the magnet to the bowl guard sensor.

2. The mixing machine of claim 1 wherein when the second portion of the bowl guard assembly is moved to place the bowl guard assembly in the bowl access orientation, the bowl guard sensor is placed in its second state.

3. The mixing machine of claim 1 wherein:
the bowl guard sensor is a switch with a conducting state and a non-conducting state, the first state is the conducting state and the second state is in the non-conducting state;
the first portion is positioned towards a support column of the mixer body, the first portion is formed primarily of a plastic material and carries a localized metallic insert at one side of the first portion to form the magnetically conductive member.

4. The mixing machine of claim 3 wherein the switch is biased into the non-conducting state, the magnetic field of the magnet moves the switch to the conducting state when the bowl guard assembly is in the bowl guarding orientation.

5. The mixing machine of claim 1 wherein the second portion rotates between nested and unnested positions relative to the first portion.

6. The mixing machine of claim 5 wherein the first portion of the bowl guard assembly is fixed.

7. The mixing machine of claim 1 wherein when the bowl guard assembly is in the bowl guarding orientation the first portion and the second portion together substantially surround the output member.

8. A mixing machine, comprising:
a mixer body including a head portion that extends over a bowl receiving location, the head portion including a magnetically actuatable bowl guard sensor for providing a guard fault output;
an output member extending downward from the head portion toward the bowl receiving location;
a drive system linked to the output member for effecting planetary rotation of the output member, the drive system connected with the bowl guard sensor, the drive system and bowl guard sensor operate together such that in a first state of the bowl guard sensor planetary rotation of the output member can be effected by the drive system and in a second state of the bowl guard sensor planetary rotation of the output member cannot be effected by the drive system;
a bowl guard assembly including a first portion and a second portion, at least the second portion is movable to enable the bowl guard assembly to be arranged in both a bowl guarding orientation and a bowl access orientation, a magnetically conductive member associated with the first portion, the second portion includes a magnet when the second portion is positioned to place the bowl guard assembly in the bowl guarding orientation the magnet is positioned at a distance from the bowl guard sensor so that the magnetically conductive member is necessary in order for a magnetic field from the magnet to reach the bowl guard sensor and place the bowl guard sensor in its first state, wherein movement of the first portion of the bowl guard assembly out of a guarding position causes the magnetically conductive member to move out of a position that conducts the magnetic field from the magnet to the bowl guard sensor.

9. The mixing machine of claim 8 wherein when the second portion of the bowl guard assembly is moved to place the bowl guard assembly in the bowl access orientation, the bowl guard sensor is placed in its second state.

10. The mixing machine of claim 8 wherein:
the bowl guard sensor is a switch with a conducting state and a non-conducting state, the first state is the conducting state and the second state is in the non-conducting state;
the first portion is positioned towards a support column of the mixer body, the first portion is formed primarily of a plastic material and carries a localized metallic insert at one side of the first portion to form the magnetically conductive member.

11. The mixing machine of claim 10 wherein the switch is biased into the non-conducting state, the magnetic field of the magnet moves the switch to the conducting state when the bowl guard assembly is in the bowl guarding orientation.

12. The mixing machine of claim 8 wherein the second portion rotates between nested and unnested positions relative to the first portion.

13. The mixing machine of claim 12 wherein the first portion of the bowl guard assembly is fixed.

14. The mixing machine of claim 8 wherein when the bowl guard assembly is in the bowl guarding orientation the first portion and the second portion together substantially surround the output member.

* * * * *